Jan. 16, 1940.   H. SAUER   2,187,057
FINDER DEVICE
Filed May 18, 1938
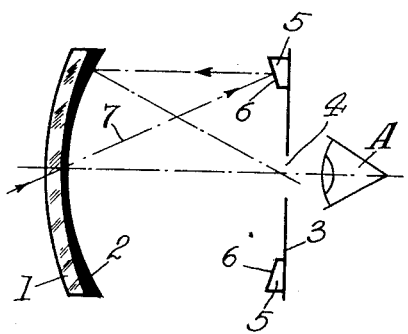
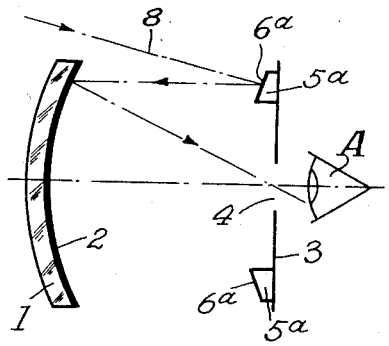
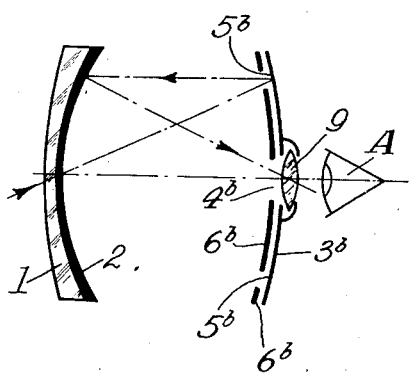
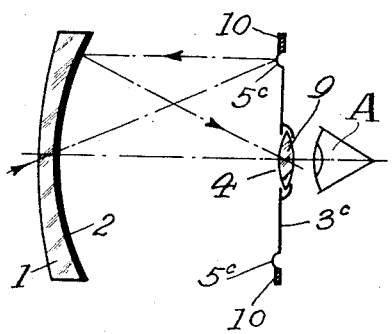
Inventor
Hans Sauer
by B. Singer & F. Stern
Attorneys Patented Jan. 16, 1940

2,187,057

UNITED STATES PATENT OFFICE 2,187,057

FINDER DEVICE

Hans Sauer, Dresden, Germany, assignor to Zeiss Ikon Aktiengesellschaft, Dresden, Germany Application May 18, 1938, Serial No. 208,669
In Germany May 14, 1937

6 Claims. (Cl. 88—1.5)

The invention relates to improvements in finder devices for photographic and motion picture cameras, and in particular is directed to finders having an observation aperture arranged at a distance in rear of an optical member having a rearwardly reflecting surface adapted to form approximately in the plane of the image appearing in the finder an image of border marks arranged around the observation aperture and indicating the limits of the picture area. It is known to make the border marks of white lacquer or of Celluloid strips on a dark back ground. In order to obtain a clear visibility of the border marks when looking into the observation aperture, it is desirable that the border lines be sufficiently illuminated and that the reflecting property of the mirror surface on said optical member is sufficient to produce a distinct image of the border lines.

It is an object of the present invention to provide a finder with markings for indicating the border of the picture area which are reflected onto a plane or curved mirror surface arranged in the plane in which appears the image of the object to be photographed, whereby the border markings consist at least partly of mirror-like surface elements. The employment of such mirror-like border marks is based upon the principle, that at a predominately brilliant reflection the brightness of the reflected image depends only upon the luminous density of the object reflected, the property of reverberation, and the losses caused by reverberation and absorption of the rays on their way to the eye of the observer. This is contrary to the use of diffused reflecting surfaces in which the brightness of the reflected image depends upon its illumination, for instance by the light entering the finder aperture.

Another object of the invention is to provide the finder with border marks which are formed of either plane, concave or convex surfaces, the border marks may also be curved cylindrically or spherically.

Another object of the invention is to employ plane border marks which consist of brilliant reflecting surface elements which are arranged in an inclined position, in such a manner that the reflected rays which reach the eye of the observer enter the casing of the finder through openings arranged outside the path of the finder light rays or through transparent surfaces.

It is also an object of the invention to arrange the brilliant reflecting faces forming the border marks in such an inclined position, that the light rays reflected by the same and which enter the eye of the observer pass only through the center portion of the optical member arranged in the forward end of the finder device. In such a case, the center portion of the mirror face on the optical member, which is used for the passage of light rays, is made more transparent than the edge portions which edge portions are used for reflecting the image of the border marks into the observer's eye.

Another object of the invention is to form the reflecting border marks on a section of a larger spherical or cylindrical surface, whose entire area except the elementary portion forming the border marks, is provided with a coating or a substance having a low reflecting property.

Still another object of the invention is to produce the border marks by either edges, ribs or beads on that wall of the finder which is provided with the observation aperture. Instead of making the border marks completely reflective, they may also be made partly predominately reflective and partly diffuse reflective. If desired, the border marks may be coated with a luminous substance.

Other objects of the invention will be apparent from the following description with reference to the accompanying drawing illustrating diagrammatically a few embodiments of the finder device of the invention. It is to be understood, that the invention is not limited to the embodiments described and illustrated, as various other forms may be adopted within the scope of the claims.

In the drawing:

The Figs. 1 to 4 illustrate each diagrammatically a different embodiment of a finder device in accordance with the present invention.

Referring to Fig. 1, the optical member 1 of the finder is provided with a rearwardly facing concave surface on which a semi-transparent mirror layer 2 is arranged which is directed toward the eye A of the observer. Preferably, the mirror coating 2 is made thinner at its center portion than at the edge portion, so that more light can pass through the center portion than through the edge portion 5. The rear wall 3 of the finder, which is spaced from the composite front member 1, 2 is provided with an observation opening 4. The front face of the rear wall 3, which faces the concave mirror layer 2, is provided with border marks 5 having an inclined reflecting face 6. The reflecting face 6, as illustrated in Fig. 1, has such an inclination with respect to the rear wall 3 that a light ray 7 passing through the center of the mirror 2 and striking the reflecting face 6 is reflected to the edge portion of the mirror layer 2 and then through the aperture 4 into the eye A of the observer. The inclination of the reflecting face 6 of the border marks 5, however, may be such that the incoming rays pass through a portion of the mirror layer 2 outside the center portion of the same.

In the embodiment of Fig. 2, the optical member 1, the mirror layer 2 and the rear wall 3 of the finder are arranged in the same manner as in Fig. 1. However, the reflecting face 6a of the border marks 5a is inclined in an opposite direction as in Fig. 1, namely so that light rays 8 entering the finder through laterally arranged openings (not shown) of the finder casing and striking the reflecting face 6a are reflected toward the edge portion of the mirror 2 and then are reflected as illustrated to the observation aperture 4.

Fig. 3 illustrates another embodiment of the invention in which the optical member 1 and the mirror layer 2 are similarly constructed as in Fig. 1. The rear wall 3b of this finder is curved spherically and in the observation aperture 4b is mounted an eye lens 9. The border marks 5b of the finder are formed by strip-like reflecting surface elements on the concave face of the rear wall 3b, while the remaining portion of the concave face is provided with a light absorbing coating 6b or is made black, so that a reverberation is prevented, and the reflecting border markings 5b appear sharply in the picture plane of the finder.

Instead of mounting special elements representing border marks upon the rear wall of the finder, the border marks may also be formed integral with the rear wall 3c by providing the latter with ribs or beads 5c as shown in Fig. 4. The rear wall 3c may be curved cylindrically or spherically, similarly as in Fig. 3. The outer edges of the reflecting border marks 5a are provided with narrow diffuse reflecting layers 10 which are especially advantageous under poor light conditions.

While in the above embodiments the border marks 5, 5a, 5b and 5c are made completely reflective, the same may also be made partly diffuse reflective by grinding or etching certain portions of the border marks.

The mirror layer may also be covered partly with a light diffusing, transparent substance or individual portions may be coated with a luminous material (phosphorus substance) in order to obtain also under poor light conditions a sharp and clear appearing border line in the picture plane.

What I claim is:

1. A finder for photographic cameras including an optical member having a rearwardly facing concave face, a semi-transparent mirror layer mounted on the concave face of said optical member, a non-transparent plate member spaced rearwardly from said optical member and having an aperture for observing the object to be photographed through said semi-transparent mirror layer, and means indicating the border of the picture area arranged on that side, of said plate member facing said optical member, said means being provided with mirror-like reflective surface elements which are inclined with respect to said plate member so as to reflect light rays entering said finder from the front for producing in said semi-transparent mirror layer a bright image of said border indicating means which image is reflected through said aperture into the eye of the observer.

2. A finder for photographic cameras including an optical member having a rearwardly facing concave face, a semi-transparent mirror layer mounted on the concave face of said optical member, a non-transparent plate member spaced rearwardly from said optical member and having an aperture for observing the object to be photographed through said semi-transparent mirror layer, and means indicating the border of the picture area arranged on that side, of said plate member facing said optical member, said means being provided with mirror-like reflective surface elements which are inclined with respect to said plate member for reflecting light rays which pass through the central portion of said optical member onto said semi-transparent mirror layer to produce on the same a bright image of said border indicating means which is visible through said aperture in said plate.

3. A finder for photographic cameras including an optical member having a rearwardly directed concave face, a semi-transparent mirror layer mounted on the concave face of said optical member, a non-transparent plate member spaced rearwardly from said optical member and having an aperture for observing the object to be photographed through said semi-transparent mirror layer, and means indicating the border of the picture area arranged in the plane of said plate member and being provided with mirror-like reflective surface elements which are inclined with respect to said plate member for reflecting light rays which enter the finder from outside the circumference of said optical member to produce in said semi-transparent mirror layer an image of said border indicating means which image is reflected through said aperture into the eye of the observer.

4. A finder for photographic cameras including an optical member having a rearwardly facing concave face, a semi-transparent mirror layer mounted on the concave face of said optical member, a curved plate member spaced rearwardly from said optical member and having its concave face directed toward the concave face of said optical member, said curved plate member being provided with an observation aperture, and means on the concave face of said plate member indicating the border of the picture area, said means comprising mirror-like reflective surface elements for producing in said semi-transparent mirror layer an image of said border indicating means.

5. A finder for photographic cameras including an optical member having a rearwardly facing concave face, a semi-transparent mirror layer mounted on the concave face of said optical member, a spherically curved plate member spaced rearwardly from said optical member and having its concave face directed toward the concave face of said optical member, said curved plate member being provided with an observation aperture, and means on the concave face of said spherically curved plate member indicating the border of the picture area, said means comprising mirror-like reflective surface elements for producing in said semi-transparent mirror layer an image of said border indicating means.

6. A finder for photographic cameras including an optical member having a rearwardly facing concave face, a semi-transparent mirror layer mounted on the concave face of said optical member, a curved plate member spaced rearwardly from said optical member and having its concave face directed toward the concave face of said optical member, said curved plate member being provided with an observation aperture, and means on the concave face of said plate member indicating the border of the picture area, said means comprising mirror-like reflective edges formed on said curved plate member and being adapted to produce in said semi-transparent mirror layer an image of said border indicating means.

HANS SAUER.